United States Patent
Stiesdal

(10) Patent No.: US 8,274,191 B2
(45) Date of Patent: Sep. 25, 2012

(54) STATOR ARRANGEMENT, GENERATOR AND WIND TURBINE

(75) Inventor: Henrik Stiesdal, Odense C (DK)

(73) Assignee: Siemens Akteingesellschaft, München (DE)

( * ) Notice: Subject to any disclaimer, the term of this patent is extended or adjusted under 35 U.S.C. 154(b) by 412 days.

(21) Appl. No.: 12/559,745

(22) Filed: Sep. 15, 2009

(65) Prior Publication Data

US 2010/0066096 A1 Mar. 18, 2010

(30) Foreign Application Priority Data

Sep. 15, 2008 (EP) .................................. 08016228

(51) Int. Cl.
 *H02K 1/18* (2006.01)
 *F03D 9/00* (2006.01)

(52) U.S. Cl. ............... 310/216.113; 310/401; 310/418; 310/266; 310/254.1; 290/55

(58) Field of Classification Search ............ 310/254.01, 310/112–114, 216.113, 401, 418, 266; 290/55, 290/44
See application file for complete search history.

(56) References Cited

U.S. PATENT DOCUMENTS 6,583,530 B2 * 6/2003 Hsu ............................ 310/418

FOREIGN PATENT DOCUMENTS

| DE | 19636591 A1 | * | 3/1998 |
| DE | 10040273 A1 | | 2/2002 |
| DE | 102004028746 A1 | * | 12/2005 |
| EP | 1093207 A2 | | 4/2001 |
| NZ | 247033 A | | 10/1994 |
| NZ | 215389 A | | 11/2000 |
| WO | WO 0060719 A1 | | 10/2000 |
| WO | 0070138 A1 | | 11/2000 |
| WO | WO 0121956 A1 | | 3/2001 |

OTHER PUBLICATIONS

DE 19636591 A1 machine translation, Dec. 12, 2011.*
DE 102004028746 A1 machine translation, Dec. 12, 2011.*

* cited by examiner

Primary Examiner — Quyen Leung
Assistant Examiner — Leda Pham

(57) ABSTRACT

A stator arrangement of an electric machine, generator, and wind turbine includes a plurality of stator segments forming substantially the stator of the electric machine in a cylindric form around a radially centered shaft. The stator arrangement is radially surrounded by a rotatably mounted rotor arrangement. The stator segments are radially mounted on an outer surface of a support structure. The support structure is fixed via rigid connections to the shaft.

17 Claims, 4 Drawing Sheets

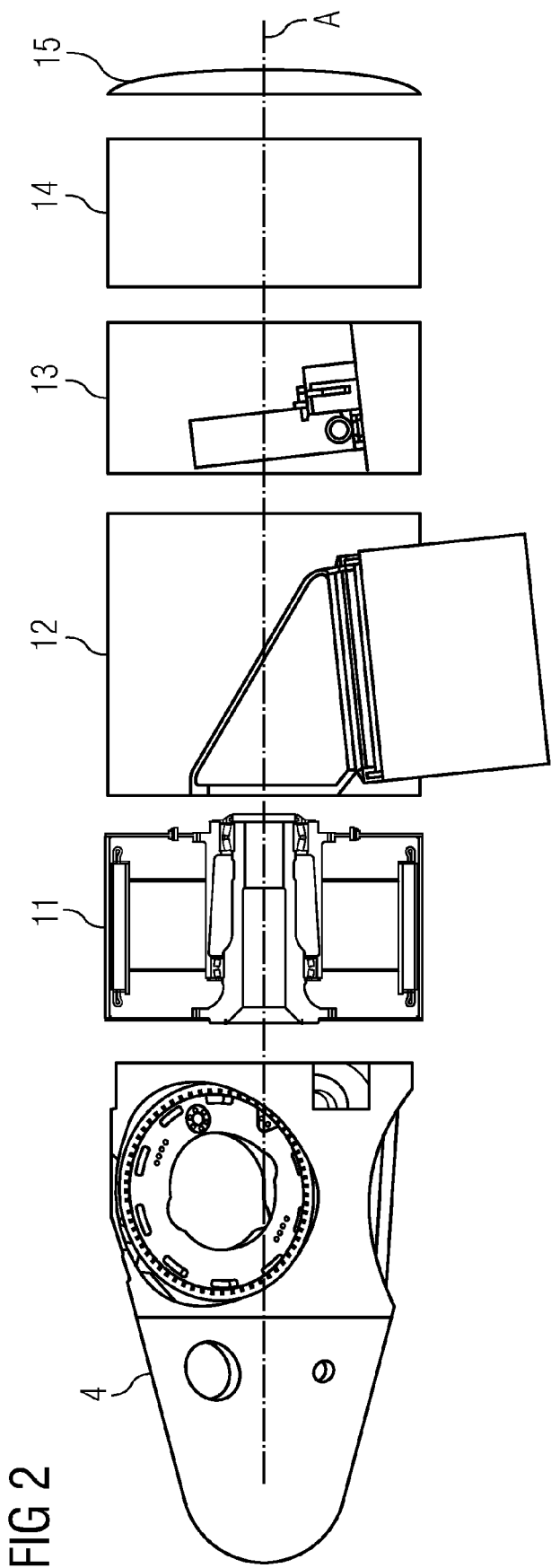

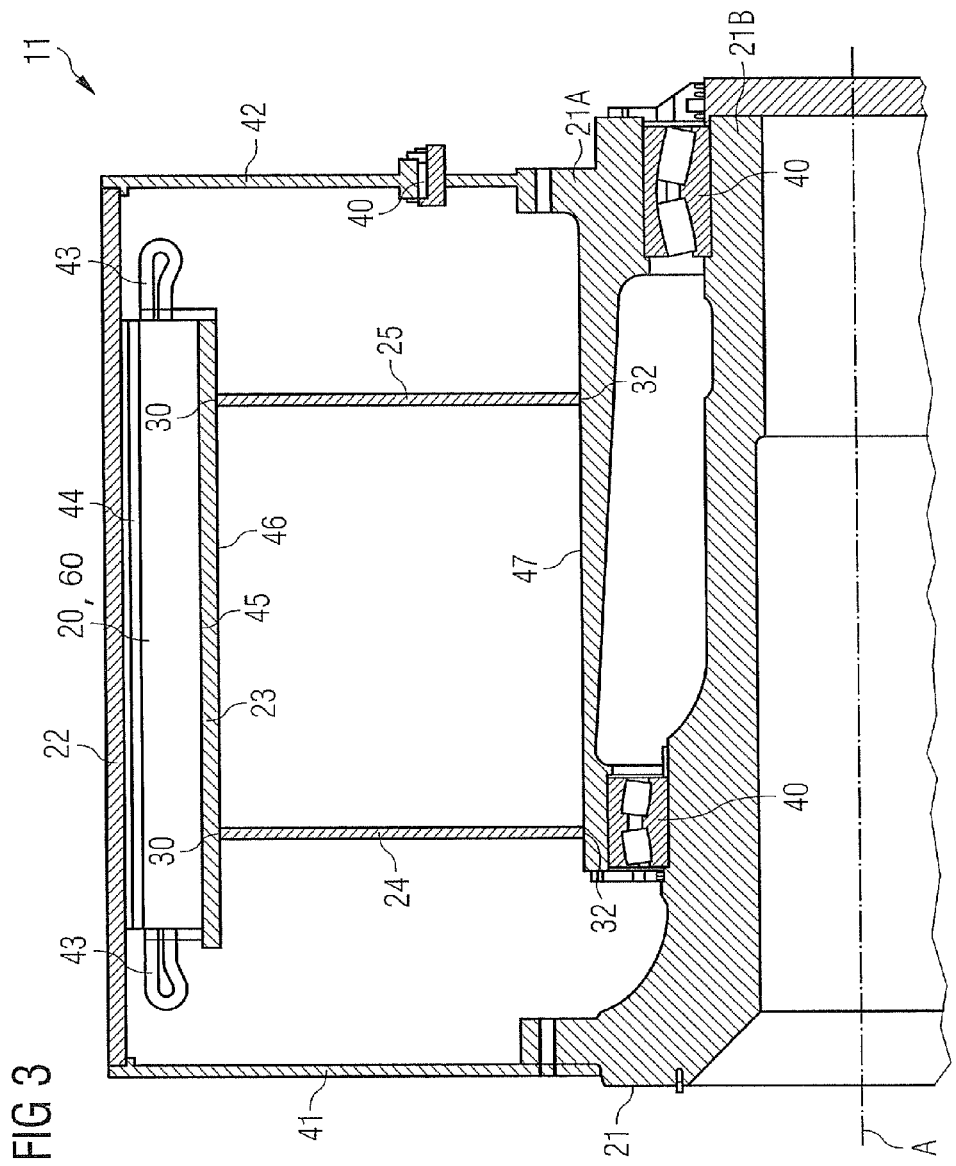

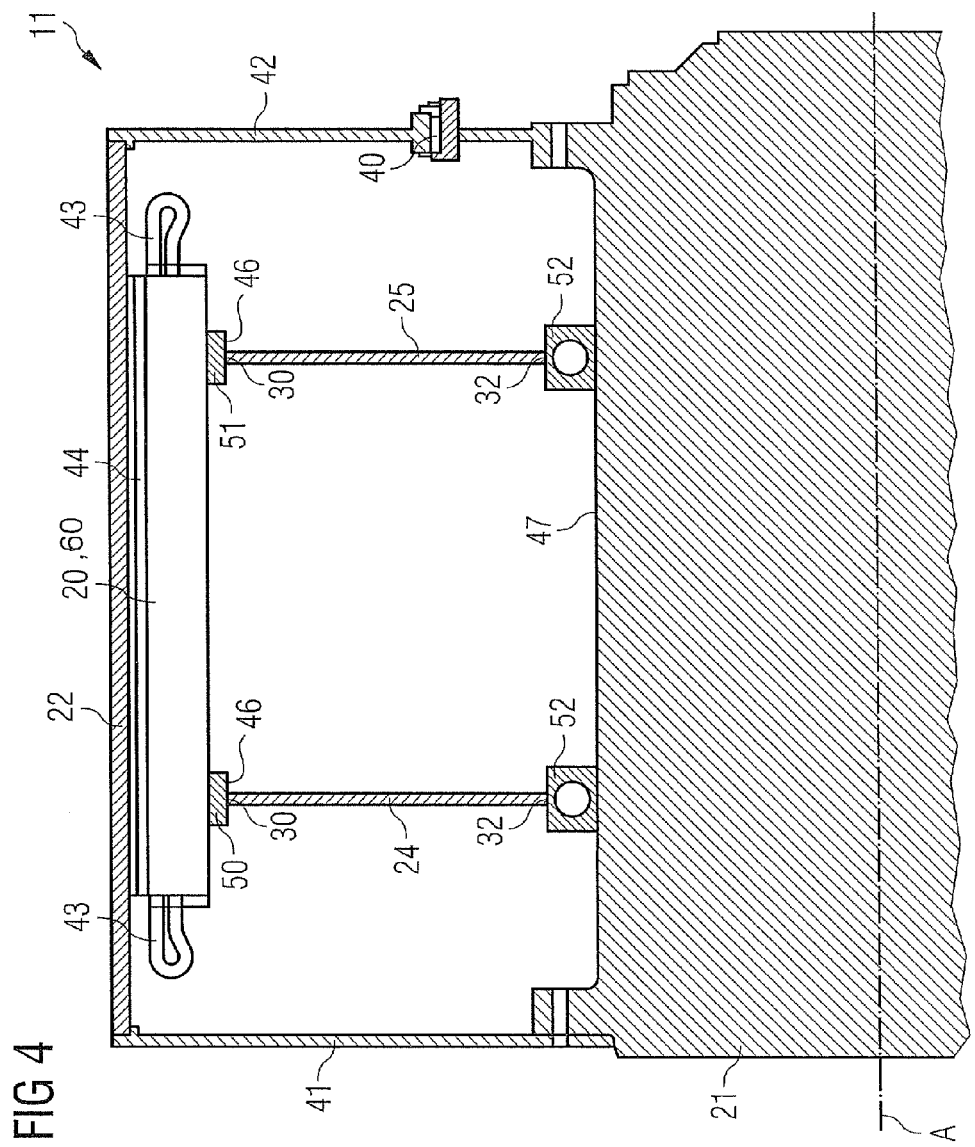

STATOR ARRANGEMENT, GENERATOR AND WIND TURBINE

CROSS REFERENCE TO RELATED APPLICATIONS

This application claims priority of European Patent Office application No. 08016228.2 EP filed Sep. 15, 2008, which is incorporated by reference herein in its entirety.

FIELD OF INVENTION

The invention relates to a stator arrangement of an electric machine, especially of a generator for a wind turbine. The invention concerns also a generator, e.g. a direct drive generator for a wind turbine comprising such a stator arrangement as well as a wind turbine comprising such a generator.

BACKGROUND OF INVENTION

Each wind turbine comprises a generator, e.g. a large direct drive generator having a generator stator and a generator rotor for the production of electrical energy.

In order to achieve a relatively high efficiency of a generator, in particular of a generator of a wind turbine, a radial air gap between the rotor elements, e.g. permanent magnets, and the stator elements, e.g. a laminate stack with windings, of the generator should be relatively small, generally in the range of only a few millimeters even for large generators like direct drive or directly driven generators with possibly a diameter of several meters.

To avoid mechanical damage to the rotor and stator elements it is thereby necessary to ensure that the outer surfaces of the rotor elements and the outer surfaces of the stator elements which are arranged oppositely to each other do not come into direct contact with each other during operation of the generator. Consequently the small air gap, which must be of relatively small height due to efficiency reasons, must be guaranteed at a nominal value within narrow tolerances.

SUMMARY OF INVENTION

In a modern wind turbine a direct drive generator can have a diameter of several meters. Maintaining the air gap in the range of a few millimeters between the rotor elements and the stator elements of a generator of such dimensions requires a comparatively rigid and therefore massive and heavy support structure, in particular of the stator arrangement.

With traditional inner rotor machines have the stator support structure on the outside, consequently this lead to large and heavy generators.

It is advantageous when the generator stator comprises a series of independent stator segments. When manufacturing the stator the active elements are much easier to handle if manufactured as segments, and a segmented stator has the benefit that in case of a fault the respective affected stator segment can be replaced at a fraction of the costs and effort as would be required for the replacement of the complete stator.

The segmentation of a stator on the other hand has a drawback in the lack of stiffness to maintain cylindricity. For a non-segmented stator the ring stiffening effects of the complete laminate stack of the stator provides substantial stiffness that contributes to maintain cylindricity. For a segmented generator, the laminate stacks do not provide any stiffness that assists to maintain cylindricity of the stator. Therefore, a substantially more elaborate support structure is required for a segmented stator to ensure form and dimension tolerances, especially regarding the air gap between the stator and the rotor.

Stiffness of the stator support structure is a function of the local cross-section—material volumes and thicknesses, and overall sectional height—of the structure. For example, the necessary stiffness of a traditional stator support structure for a large electrical machine may be achieved with 200 mm T-beams welded to the outside of the laminate of an outer stator, and supplemented with an outer shell, leading to a total thickness of the support structure cross-section of 300 mm. If the air gap radius is 2000 mm and the laminate stack has a radial height of 200 mm, then the net radius of the generator is 2200 mm. But when 300 mm of support structure is added, the radius is increased to 2500 mm. This might cause a large difference in overall transportation costs and leads to significant additional weight.

It is therefore an object of the present invention to provide a segmented stator arrangement, a generator as well as a wind turbine as initially mentioned in such a way, that the air gap distance can be very precise in respect of form and dimension tolerances, especially cylindricity, roundness and diameter without needs for excessive support structures.

The object of the invention is inventively achieved by a stator arrangement, by a generator, and by a wind turbine.

Advantageous embodiments can be found in the dependent claims.

The inventive stator arrangement of an electric machine comprising a plurality of stator segments forming substantially the stator of the electric machine in a cylindric form around a radially centered shaft, wherein the stator arrangement is radially surrounded by a rotatably mounted rotor arrangement, the stator segments are radially mounted on an outer surface of a support structure, the support structure is fixed via rigid connections to the shaft.

The support structure for the stator may comprise one or more supporting members arranged concentrically with the shaft.

The stator arrangement according to the invention is particularly advantageous because the segments of the inner stator can easily be assembled to the stator support structure, since they can be mounted one by one in a radial direction. For a classical inner rotor machine, where the rotor is rotating inside the stator, this is not possible due to the wedge shape of the segments. For such classical inner rotor machine the segments would either have to be complete stand-alone units each with a complete support structure and supported only at the ends, outside the winding heads, or they would have to be assembled in the axial direction, at least for the final segment, which might be difficult due to the small tolerances required.

The stator arrangement is particularly advantageous because the stator support structure can be made very stiff without any consequence for the external dimensions of the generator. The stator support structure can have a very large sectional height, basically comprising all of the space between the generator shaft and the inner surface of the stator segment laminate stack. This means that it is easy to provide such stiffness as is required to ensure the necessary support for the segments so that the air gap—also during operation of the generator—can be maintained precisely in the desired range of radial distance between the inner stator and the outer rotor.

Due to the fact that stiffness increases with the square of the section height, the supporting structure can easily be made an order of magnitude stiffer than for an outer stator.

In a preferred embodiment the stator support structure comprises a cylinder built in form of a single annular pipe, supported by two end plates where a first one of the two end plates is mounted to the pipe close to one end of the pipe and a second one of the two end plates is mounted to the pipe close to the other end of the pipe. The stator segments are mounted on the outside of the annular pipe.

In an alternative embodiment the stator support structure comprises at least one cylinder built in form of a first and a separate second annular flange and a first one of the two end plates is mounted to the first flange and a second one of the two end plates is mounted to the second flange. The flanges then should be arranged each close to one of the axial ends of the laminate stack. The stator segments are mounted on the annular flanges.

In an alternative embodiment the stator support structure comprises a polygonal structure comprising one or more members connecting the polygonal structure to the central part of the generator, preferably arranged in the form of a first and a separate second polygonal structure each having the same number of surfaces as the number of stator segments, each arranged close to one of the axial ends of the laminate stack. The stator segments are then fitted with planar mounting surfaces and are mounted on the polygonal surfaces of the support structure.

The polygonal structure may be perpendicular to the axis of the generator.

In yet another embodiment the stator support structure comprises two end plates that are mounted to a radial outer surface of the shaft of the generator, whereas the outer surface of the shaft is immobile or immotile in relation to the casing of the generator. Thus the mentioned outer surface of the shaft does not turn or rotate around the axis of the shaft.

In an alternative embodiment the stator support structure comprises two end plates that are mounted each via bearings to a radial outer surface of the shaft, whereas the shaft is pivotable. This allows having the stator fixed in relation to the casing of the generator even though the shaft and the surface of the shaft adjacent to the inner circumference of the end plates rotate around its axis. Together with the height of the bearings the end plates guarantee a precise distance of the stator laminate stacks to the shaft or to the axis of the generator. This again then guarantees the width of the air gap because the outer rotor is connected and rotatably coupled to the same rotating shaft.

The object of the present invention is also inventively achieved by a generator comprising a stator arrangement as described before and a wind turbine comprising a generator with a stator arrangement as described before.

BRIEF DESCRIPTION OF THE DRAWINGS

The invention will in the following be explained in more detail with reference to the schematic drawings, wherein
FIG. 2 shows modules of a wind turbine,
FIG. 3 shows a generator of the wind turbine,
and
FIG. 4 shows an alternative implementation of a generator.

DETAILED DESCRIPTION OF INVENTION

Figure 1:
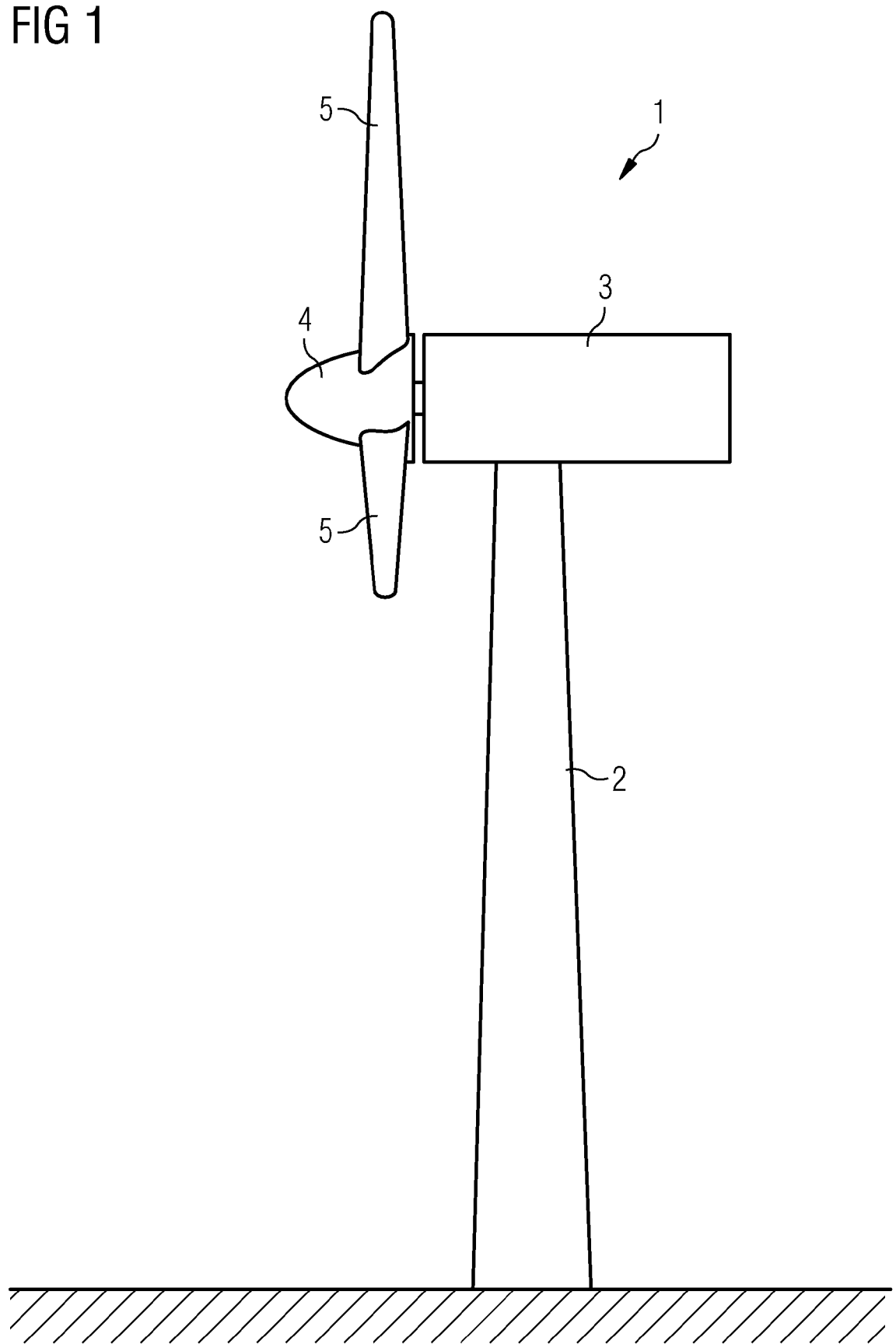
FIG. 1 shows a wind turbine.

FIG. 1 shows a wind turbine 1 comprising a tower 2, a nacelle 3 and a hub 4 with rotor blades 5. In the nacelle 3 several further components of the wind turbine 1 are arranged like a generator 11 as it is schematically shown in FIG. 2. The generator 11 is in a not shown manner connected to the hub 4 for the production of electrical energy and has a substantially horizontally aligned centre axis A.

FIG. 2 shows some basic components of a wind turbine 1. The components are shown with a slight gap between each other, even though when assembled, these gaps are closed. Again, a hub 4 is shown to which the rotor blades—not shown—will be attached. Further components, each adjacent to each other, are the generator 11, the load/bearing section 12, which has a connection to the not shown tower 2. Next, further components are a control unit 13, cooling equipment 14, and an end cap 15.

FIG. 3 shows one embodiment of the generator 11 as the inventive electric machine with the inventive stator arrangement 20. FIG. 3 is a sectional drawing showing the shaft 21, the rotor 22, and the stator 20 of the generator 11. A rotary axis A of the substantially rotational symmetric generator 11 is indicated by a broken line.

The shaft 21 has mainly two separate parts, an outer stationary part 21A and an inner rotating part 21B, which are connected via bearings 40. The radially inner part 21B of the shaft 21 is driven by the blades 5 and the hub 4 and revolves around the axis A. Tightly fixed to the revolving part 21B of the shaft 21 a first rotor end plate 41 on the left hand side and a second rotor end plate 42 on the right hand side of the figure is displayed. Both rotor end plates 41, 42 are connected to the outer rotor 22 and thereby build the casing of the stator arrangement. The second rotor end plate 42 is attached to a bearing 40 that provides a lose connection to the fixed part 21A of the shaft 21. The first and second end plates (41, 42) together with the outer rotor 22 comprise the casing of the stator arrangement.

The inner stator 20 is indicated by a stator segment 60 comprised of a laminate stack.

The air gap 44 between the outer rotor 22 and the inner stator 20 is also indicated in the figure.

Inwardly, a tube like cylinder 23 is provided to assemble the stator segments. 60 The tube like or pipe like cylinder 23 in this embodiment has to a large extend the same cylinder length as the length of the laminate of the stator. At the outer surface 45 of the cylindric tube, the stator segments 60 are attached in a fixed manner At the inner surface 46 of the cylindric tube, the two inventive end plates 24, 25 are attached at a circular circumference 30 of the end plates 24, 25.

The end plates 24, 25 are also attached via an inner circumference 32 to an outer surface 47 of the outer part 21A of the shaft 21, which is in the centre of the generator 11, circular around the axis A. In this embodiment the end plates 24, 25 are attached in a fixed way to the outer part 21A of the shaft 21 that does not rotate.

The end plates 24, 25 themselves shown in the embodiment are disc like shaped with a small height and a large outer radius. Example values for a generator 11 with an air gap 44 radius of 2000 mm (millimeter) and a laminate stack height of the stator of 200 mm is a height of 300 mm for each end plate 24, 25—or larger—to reach the necessary stiffness. This also depends on the inner radius of the end plates 24, 25 that correspond to the outer radius of the shaft 21. In a preferred embodiment this inner radius of the end plates 24, 25 might be 600 mm. Therefore the support structure of the end plates 24, 25 will be 2000 mm minus 200 mm minus 600 mm, which equals to a radial difference height of 1200 mm. As already mentioned, stiffness increases with the square of the radial height. Therefore this solution with an inner stator 20 and end plates 24, 25 of radial height of 1200 mm is an order of magnitude more stiff than for an outer stator of a generator of the same size.

In the following an alternative embodiment is discussed by means of FIG. 4, in which components that were already disclosed for FIG. 3 are given same reference signs as before.

FIG. 4 shows, compared to FIG. 3, two differences that each also could be combined independently with the features of the previous embodiment according to FIG. 3. The first modification is that the tube like cylinder 23 of FIG. 3 which was provided to assemble the stator segments 60, is replaced by two separate flanges 50, 51. The second modification is how the end plates 24, 25 are attached to the shaft 21. In this case the end plates 24, 25 are attached to bearings 52 which again are directly connected to the rotating shaft 21. With this again it can be guaranteed that the stator 20 stays fixed in relation to the housing of the generator 11.

Besides the fact that the end plates 24, 25 are identical or widely identical in shape like the ones of FIG. 3 and are attached to the flanges 50, 51 via its outer radial surfaces 30 in direction of the stator segments 60 and via its inner radial surfaces 32 to the bearings 52 in the direction of the shaft 21, there is no conceptual difference regarding the end plates 24, 25 compared to the embodiment of FIG. 3. Again, due to the reduced radial height of the end plates 24, 25, the stiffness of the stator arrangement 20 largely increases. And this again guarantees that the air gap 44 will be almost perfectly of the same width overall the perimeter of the stator arrangement 20. Generally, as already mentioned, the embodiments relate to a stator arrangement 20 of an electric Machine—the generator 11 of a wind turbine 1—comprising a plurality of stator segments 60 forming substantially the stator of the electric machine in a cylindric form around a radially centered shaft 21, wherein the stator arrangement 20 is radially surrounded by a rotatably mounted rotor arrangement 22, the stator segments 60 are radially mounted on an outer surface of a support structure 23, and the support structure 23 is fixed via rigid connections to the shaft 21.

Possibly the rigid connections to the shaft 21 may comprise two basically annular shaped end plates 24, 25 connected to the shaft 21, the two end plates 24, 25 being perpendicular to the shaft axis A, each end plate 24, 25 mounted with the outer radial surface 30 of the end plate 24, 25 to an inner surface 31 of the stator segments 60 or a supporting cylinder 23 and each end plate 24, 25 mounted with the inner radial surface 32 of the end plate 24, 25 to an radial outer surface 47 of the shaft 21.

The support structure may be in form of at least one cylinder. Specifically the at least one cylinder 23 may be built in form of a single annular pipe 23 and a first one of the two end plates 24, 25 is mounted to a first end section 34 of the pipe 23 and a second one of the two end plates 24, 25 is mounted to a second end section 34 of the pipe 23.

The end plates 24, 25 themselves may support the wanted stiffness by constructional means of the end plates and/or by selecting material that can not be bent that easily.

The invention claimed is

1. A stator arrangement, of an electric machine, comprising:
    a support structure; and
    a plurality of stator segments, which substantially form a stator of the electric machine, in a cylindric form around a radially centered shaft, the plurality of stator segments are radially mounted on an outer surface of a support structure,
    wherein the stator is radially surrounded by a rotatably mounted rotor arrangement, and
    wherein the support structure is fixed via rigid connections to the shaft, and
    wherein a casing of the electric machine includes two rotor end plates connected to the rotor arrangement, wherein a first of the rotor end plates is further connected to an inner rotating part of the second of the rotor end plates is connected to a bearing which is further connected to an outer stationary part of the shaft.

2. The stator arrangement according to claim 1, wherein the electric machine is a generator.

3. The stator arrangement according to claim 1, wherein the electric machine is a generator for a wind turbine.

4. The stator arrangement according to claim 1, wherein the support structure comprises a cylindrical structure which is connected to the shaft via two end plates.

5. The stator arrangement according to claim 4, wherein the two end plates are mounted directly to a radial outer surface of an outer part of the shaft, the outer surface of the shaft is immobile in relation to the casing of the generator.

6. The stator arrangement according to claim 4, wherein the outer surface of the shaft is immobile in relation to the casing of the generator due to bearings which are placed between the outer part and an inner part of the shaft and/or between the casing and the outer part of the shaft.

7. The stator arrangement according to claim 6, wherein the two end plates are each mounted via bearings to the radial outer surface of the shaft, whereas the shaft is pivotable.

8. The stator arrangement according to claim 1, wherein the support structure comprises a first and a second annular flange and two end plates, and a first of the two endplates is mounted to the first flange and a second of the two end plates is mounted to the second flange.

9. The stator arrangement according to claim 8, wherein the two end plates are mounted directly to a radial outer surface of an outer part of the shaft, the outer surface of the shaft is immobile in relation to the casing of the generator.

10. The stator arrangement according to claim 9, wherein the outer surface of the shaft is immobile in relation to the casing of the generator due to bearings which are placed between the outer part and an inner part of the shaft and/or between the casing and the outer part of the shaft.

11. The stator arrangement according to claim 10, wherein the two end plates are each mounted via bearings to the radial outer surface of the shaft, whereas the shaft is pivotable.

12. The stator arrangement according to claim 1, wherein the support structure comprises a polygonal structure supported by at least two end plates.

13. The stator arrangement according to claim 12, wherein the two end plates are mounted directly to a radial outer surface of an outer part of the shaft, the outer surface of the shaft is immobile in relation to the casing of the generator.

14. The stator arrangement according to claim 13, wherein the outer surface of the shaft is immobile in relation to the casing of the generator due to bearings which are placed between the outer part and an inner part of the shaft and/or between the casing and the outer part of the shaft.

15. The stator arrangement according to claim 14, wherein the two end plates are each mounted via bearings to the radial outer surface of the shaft, whereas the shaft is pivotable.

16. A generator, comprising:
    a stator arrangement according to claim 1.

17. A wind turbine, comprising:
    a generator according to claim 16.

* * * * *